Patented Apr. 8, 1952

2,592,058

UNITED STATES PATENT OFFICE 2,592,058

POLYVINYL ALCOHOL ESTER OF AN ACID ESTER OF CARBONIC ACID AND AN UNSATURATED ALCOHOL

Irving E. Muskat, Plainfield, N. J., and Franklin Strain, Norton Center, Ohio, assignors, by mesne assignments, to Columbia-Southern Chemical Corporation, Pittsburgh, Pa., a corporation of Delaware No Drawing. Application February 21, 1947, Serial No. 730,204. In Great Britain September 11, 1941

2 Claims. (Cl. 260—77.5)

This invention relates to novel unsaturated esters and to novel polymers of unsaturated esters. The problem of obtaining satisfactory polymers by polymerization of polycarboxylic acid esters of unsaturated alcohols such as allyl alcohol, is complicated by the fact that the polymers usually produced are unduly brittle and have a low flexural strength. For example, diallyl maleate and diallyl succinate polymerize to form products which are quite brittle.

We have found that less brittle polymers are produced by polymerization of esters wherein the length of the chain of atoms between the unsaturated groups is relatively long. However, when the chain between the unsaturated groups simply is lengthened by lengthening the carbon chain, comparatively soft, weak polymers are generally obtained. For example, the polymer of diallyl adipate is much weaker than the polymer of diallyl succinate.

In accordance with the present invention we have provided novel types of polymers which have superior flexural strength and/or other desirable properties. Moreover, we have provided novel types of monomeric esters which are capable of polymerization to form superior polymers of comparatively high strength. These novel polymers are the products of polymerization of an ester of: (a) a polyhydroxy compound containing at least two hydroxy groups esterifiable by acids and (b) an acid ester of an unsaturated alcohol such as allyl alcohol or methallyl alcohol and carbonic acid; in which ester at least two of the hydroxy groups of (a) are esterified with (b). The polymers of the invention are formed by polymerization of these carbonate esters in the presence of ultra violet light, oxygen, peroxy compounds or other catalyst usually in concentration above about 0.1% by weight based upon the weight of unsaturated polymerizable compounds, which catalyzes the polymerization of unsaturated carbon-carbon aliphatic bonds. The monomeric carbonate esters are quite stable when heated at temperatures well above 100° C. and polymerize but little if at all when heated in the absence of a catalyst. Consequently recourse to some catalytic method to promote polymerization has been found essential. A wide variety of polymers ranging from relatively rigid polymers having high flexural strength to relatively soft, tough flexible products may be obtained by polymerization of the above monomeric esters. The term polymer as herein contemplated includes copolymers such as will be discussed hereinafter.

When it is desired to produce polymers of high flexural strength according to the invention, it is essential to polymerize carbonate esters of the type herein described which are free from long side chains between the unsaturated polymerizable groups, since the presence of such long side chains tends to cause formation of weaker polymers. In accordance with the present invention we have prepared novel esters of: (a) a polyhydroxy compound which contains at least two hydroxyl groups which are esterifiable by acids, and which has no side chain, which is longer than three carbon atoms and which has more than ten atoms, attached to the main or primary chain linking the hydroxy groups, and (b) an acid ester of an unsaturated alcohol such as allyl alcohol or methallyl alcohol and carbonic acid; in which at least two of the hydroxy groups of (a) are esterified with (b). The term "side chain" as herein used means open side chains and does not include the closed branch chains of a closed ring. Thus the cellulose molecule which is understood to have the structure can have side chains of but one

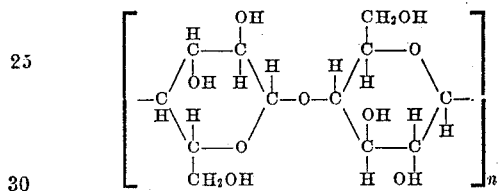

carbon atom each even if a $CH_2OH$ group thereof is not esterified by the carbonic acid ester.

The term "side chain" does not refer to carbalkenyloxy or carbalknyloxy chains established in an ester in which more than two hydroxyl groups are esterified by the carbonic acid ester since such chains obviously are main chains linking the acid ester groups and are not side chains. For example, glycerol tris (allyl carbonate) is an ester of glycerol which has no side chains longer than one atom and does not have a side chain between the first and third carbon atoms of the glycerol due to the esterification of the hydroxyl group attached to the second carbon atom by the allyl acid carbonate group.

It will be apparent to those skilled in the art that there exist certain exceptions to the general principle that long side chains are objectionable for optimum strength. For example, the presence of side chains which themselves contain polymerizable radicals such as a methacrylyl group or similar group is not ordinarily objectionable.

Where the chain of atoms between the unsaturated groups becomes long, soft polymers having a low flexural strength may tend to be obtained. However, the character of polymer secured is dependent to a considerable degree upon the nature of the groups in the chain of atoms between the unsaturated carbon-carbon polymerizable groups. We have found that the number of ester

groups, in the chain between the unsaturated groups substantially influences the character of the polymer obtained. Where polymers of high flexural strength are desired, it is preferable to polymerize esters wherein the ratio of the number of atoms between the unsaturated aliphatic polymerizable carbon-carbon groups to the number of ester and carbon amide groups and benzene rings in the atom chain linking the unsaturated carbon-carbon groups is not greater than about 4.5. In computing this ratio the carbonic linkage

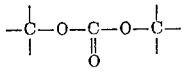

is considered to have two ester linkages. Thus, diethylene glycol bis (allyl carbonate) has 4 ester linkages between the allyl groups. Moreover the ratio of the number of atoms in the chain linking these unsaturated groups to the number of polymerizable unsaturated groups so linked rarely should exceed 15 nor should the ratio of the number of carbon atoms in the molecule to the number of unsaturated polymerizable aliphatic carbon-carbon groups exceed about 15 if products of optimum flexural strength are to be desired.

Where flexural strength is unimportant a much wider variety of polyhydroxy-carbonate esters of the type herein described may be polymerized within the purview of the invention. Thus, many such esters may be polymerized to produce products of low flexural strength but having other desirable properties such as flexibility water resistance, organic solvent resistance, toughness, etc.

The esters of the type herein contemplated may be prepared by the reaction of allyl chloroformate or a chloroformate of an equivalent unsaturated alcohol with a polyhydroxy compound, usually in the presence of an organic or inorganic base such as, pyridine or aqueous sodium hydroxide or sodium carbonate, the amount of the chloroformate used being sufficient to esterify at least two of the hydroxy groups in the molecule of the polyhydroxy compound. Alternatively certain of these esters may be formed by reacting allyl or similar alcohol with a polychloroformate as described and claimed in our United States Patent No. 2,370,571.

The invention is particularly concerned with esters of allyl and methallyl alcohol and their polymers. However the invention contemplates also the corresponding esters and polymerized esters of other unsaturated alcohols which preferably contain the groups

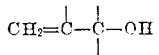

or

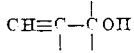

and which in any event have an unsaturated aliphatic carbon-carbon bond between the beta and gamma carbon atoms of the alcohol. Thus, the invention contemplates the corresponding esters and polymerized esters of other unsaturated aliphatic alcohols containing 3 to 10 (rarely more than 5) carbon atoms such as allyl, methallyl, crotyl, 2-chlorallyl, chlorocrotyl, ethylallyl, cinnamyl, methyl, vinyl, carbinyl, propargyl or other lower unsaturated alcohol.

Carbonic esters of various polyhydroxy compounds are contemplated including esters of alkylene glycols such as ethylene glycol, propylene glycol, 1,2-butylene glycol or isobutylene glycol or other glycols such as trimethylene glycol, tetramethylene glycol, 1,3-dibutylene glycol, pentamethylene glycol, pinacol, dioxane diols or thiodiglycol or the monomethyl ether of glycerol and the polyglycols such as di-, tri-, and tetraethylene glycol, di-, tri-, and tetrapropylene glycols and other polyhydroxy compounds including erythritol, glycerol, glycerol monochlorohydrin, methyl glycerol, pentaerythritol, mannitol, sugars such as glucose, lactose, sucrose or maltose and the alicyclic polyhydroxy compounds such as pyrogallol, hydroquinone, 1,3-xylylene alcohol, phthalyl alcohol, or 1,4-dihydrocyclohexane, resorcinol and heterocyclic polyhydroxy compounds such as 2-5-bis (hydroxy methyl) furan, 3,5-dihydroxy coumarone, p,p'-dihydroxydiphenyl ethers, or 1,2-di-(p-hydroxyphenyl)-1,2 diethyl ethylene. Other carbonic esters herein contemplated include the allyl acid carbonate esters of more complex polyhydroxy compounds including polymerized alcohols such as polyvinyl alcohol or polyallyl alcohol, cellulose hydrate, cellulose monoacetate, cellulose diacetate, cellulose mono- or dibutyrate, methyl or ethyl cellulose and similar cellulose derivatives.

These new carbonate esters are generally nonresinous liquids of high boiling point. They are generally miscible with solvents such as benzene, toluene chloroform, diethyl ether, carbon tetrachloride and petroleum ether. The monomeric esters are valuable as plasticizers for various resin materials such as styrene, cellulose or urea, phenolic, vinyl and acrylic resins.

These esters may be polymerized under the influence of heat, or light in the presence of catalysts such as oxygen, ozone or peroxides such as benzoyl peroxide, lauroyl peroxide, acetone peroxide or other peroxy catalyst such as mentioned in United States Patent No. 2,379,218, granted to William R. Dial et al. Catalyst concentrations of 0.1 to 5 percent or more by weight based upon the weight of the ester, normally are used.

Upon the initial polymerization of the polyunsaturated esters in liquid monomeric state or in a solution of the monomer in suitable solvents, an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing a substantial portion of a polymer which is insoluble in the monomer and organic solvents and containing as well, a substantial portion of a soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids, and alkalies.

Soluble fusible polymers of these novel carbonate esters may be prepared and further polymerized to a final essentially insoluble and/or infusible state, by the process described in United States Patent No. 2,273,891 granted to Maxwell Pollack et al. Cast polymers may be prepared according to the process described in United States Patent No. 2,379,218 granted to William R. Dial et al.

The process may also be extended to the production of mixed polymers or copolymers. Thus, the monomer or fusible polymer prepared in accordance with our invention may be mixed with other monomers or polymers, such as the monomer or polymer of methyl methacrylate, methyl chloracrylate, vinyl acetate, vinyl chloracetate, vinyl chloride, styrene, etc., and the mixture subjected to conditions of polymerization.

The following examples are illustrative:

Example I

Phosgene was bubbled into a flask containing allyl alcohol at a rate of 20 millimoles per minute while agitating the mixture and cooling to a temperature below about 15 to 20° C. After phosgene in the proportion of about 0.9 mole of phosgene per mole of allyl alcohol had been introduced, the mixture was allowed to stand for one hour. Thereafter, the reaction mixture was washed with water to remove unreacted allyl alcohol and dried over calcium chloride.

2.2 mols of allyl chloroformate was added dropwise to a solution of one mole of ethylene glycol in 2.4 moles of pyridine while cooling the reaction mixture to a temperature of 10 to 15° C. After the chloroformate had been added, the mixture was allowed to stand at room temperature for about one hour. The product was diluted with water, washed with dilute HCl solution and then with sodium chloride solution until the product was neutral. Thereafter, the product was washed with water and dried over calcium chloride. The ethylene glycol bis (allyl carbonate) having a boiling point of about 118–122° C. at 1 mm., an index of refraction of about $N_D^{20}$ 1.4443, a density ($d_4^{20}$) of about 1.114, and having the probable formula $$CH_2=CHCH_2O-\underset{\underset{O}{\|}}{C}-OCH_2CH_2O-\underset{\underset{O}{\|}}{C}-O-CH_2CH=CH_2$$

was obtained.

Example II

Phosgene was bubbled into a flask containing methallyl alcohol at a rate of 20 millimoles per minute while agitating the mixture and cooling to a temperature below about 10° C. After phosgene in the proportion of about 0.8 mole of phosgene per mole of methallyl alcohol had been introduced, the mixture was allowed to stand for one hour. Thereafter, the reaction mixture was washed with water and methallyl chloroformate was recovered. This compound has an index of refraction at 20° C. of 1.427 and a boiling point of approximately 130° C. at atmospheric pressure.

2.2 moles of methallyl chloroformate was added dropwise to a solution of one mole of ethylene glycol in 2.4 moles of pyridine while cooling the reaction mixture to a temperature of 10 to 15° C. After the chloroformate had been added, the mixture was allowed to stand at room temperature for about one hour. The product was diluted with water, washed with dilute HCl solution and then with sodium chloride solution until the product was neutral. Thereafter, the product was recovered and dried over calcium chloride. The ethylene bis (methallyl carbonate) obtained was a colorless liquid which boiled at 142° C. at 2 mm. in a slow stream of carbon dioxide, and had a density of about 1.110 and an index of refraction ($N_D^{20}$) of about 1.4490. The probable formula of this compound was as follows:

$$CH_2=\underset{\underset{CH_3}{|}}{C}-CH_2O-\underset{\underset{O}{\|}}{C}-O-CH_2CH_2-O-\underset{\underset{O}{\|}}{C}-O-CH_2-\underset{\underset{CH_3}{|}}{C}=CH_2$$

Example III 7.8 moles of allyl chloroformate was added dropwise to a solution of 3.3 moles of triethylene glycol in 8 moles of pyridine while cooling the reaction mixture to a temperature of 10 to 15° C. After the chloroformate had been added, the mixture was allowed to stand at room temperature for about an hour and the ester washed and recovered as in Example I. The triethylene bis (allyl carbonate) obtained was a colorless liquid which had an index of refraction ($N_D^{20}$) of 1.452 and a density ($d_4^{20}$) of 1.135 and the probable formula of this compound was as follows:

$$CH_2=CH-CH_2O-\underset{\underset{O}{\|}}{C}-O-CH_2CH_2-O-CH_2CH_2-O-CH_2-CH_2-O-\underset{\underset{O}{\|}}{C}-O-CH_2-CH=CH_2$$

Example IV

The process described in Example I was repeated using an equivalent amount of tetraethylene glycol in lieu of ethylene glycol. The ester thus secured was a colorless liquid which had an index of refraction ($N_D^{20}$) of about 1.454, a density of 1.133 at 25° C. Polymerization of this material occurred when distillation was attempted at 2 mm. pressure.

Example V

The process described in Example I was repeated using an equivalent amount of diethylene glycol in lieu of ethylene glycol. The ester thus obtained was a colorless liquid which had an index of refraction of 1.449 at 20° C., a density of about 1.133 at 20° C./4° C. and a boiling point of about 166° C. at 2 mm. pressure.

Example VI

The process of Example IV was repeated using an equivalent amount of methallyl alcohol in lieu of allyl alcohol. The methallyl ester thus produced was a colorless high boiling liquid which polymerized when distillation was attempted at 2 mm. pressure.

Example VII

The process of Example III was repeated using an equivalent amount of methallyl alcohol in lieu of allyl alcohol. The triethylene glycol bis (methallyl carbonate) obtained was a colorless high boiling liquid which polymerized when distillation was attempted at 2 mm. pressure.

Example VIII

The process of Example V was repeated using an equivalent amount of methallyl alcohol in lieu of allyl alcohol. The diethylene glycol bis (methallylcarbonate) obtained was a colorless liquid having a refractive index at 20° C. of about 1.453, a density (20/4) of about 1.114.

Example IX 95 parts of allyl salicylate was dissolved in 250 parts of acetone and 22 parts of sodium hydroxide dissolved in water was slowly added. During this addition, a stream of phosgene was passed into the solution and the temperature of the solution was maintained below about 15° C. The reaction mixture was diluted with cold water and the solid carbonate precipitated. This ester was washed with water and recrystallized from alcohol. It possessed a melting point of 51–53° C. The product was the carbonate diester of allyl salicylate.

*Example X*

25 moles of phosgene was passed into 10 moles of ethylene glycol at a rate of 100 millimoles per minute and at a temperature below about 20° C. The reaction mixture was warmed to 35° C. and evacuated for several minutes by means of a vacuum pump to remove excess phosgene. The reaction mixture was washed four times with water and dried over calcium chloride, whereby the dichloroformate of ethylene glycol was obtained. This compound was a colorless liquid having a density ($D_{4° C.}^{20° C.}$) of 1.456.

*Example XI*

7.2 moles of allyl chloroformate was added dropwise to a solution of 2 moles of glycerine in 7.8 moles of pyridine while cooling the reaction mixture to a temperature of 10 to 15° C. After the chloroformate had been added, the mixture was allowed to stand at room temperature for about 45 minutes. The products were washed with water and recovered as in Example I. The glyceryl tris (allyl carbonate) thus obtained was a colorless liquid having an index of refraction ($N_D^{20}$) of about 1.4558, and a density ($d_4^{20}$) of about 1.194. The probable formula of this compound is:

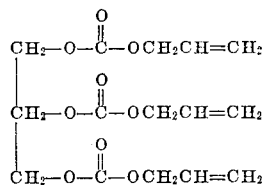

*Example XII*

2.79 moles of diethylene bis-chloroformate was added slowly to 6.14 moles of 2-chlorallyl alcohol dissolved in 6.7 moles of pyridine. The reaction mixture was washed and purified as in Example I. The product obtained, diethylene glycol di(2-chloroallyl carbonate), was a colorless liquid which possessed an index of refraction ($N_D^{20}$) of about 1.472 and a density ($D_4^{20}$) of about 1.30.

*Example XIII*

12.1 parts by weight of allyl chloroformate was slowly added to 16.4 parts by weight of castor oil in the presence of a large excess of pyridine. The product was washed successively with water, dilute hydrochloric acid and then with water. Thereafter, the product was heated to 100° C. to remove volatile impurities. The product obtained was a liquid which was soluble in petroleum ether.

*Example XIV*

A quantity of ethylene glycol bis (allyl carbonate) prepared as in Example I, was dissolved in an equal weight of dioxane and 4 percent benzoyl peroxide on the basis of the weight of the monomer was introduced. The solution was heated, with stirring, at 80 to 85° C. until the viscosity had increased noticeably. Thereafter, the mixture was cooled and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A white granular solid was obtained. A quantity of this polymer was mixed with 5 percent benzoyl peroxide, placed in a mold and heated to 145° C. under a pressure of 2000 pounds per square inch for 15 minutes and a transparent sheet of infusible, insoluble polymer was obtained.

*Example XV*

A quantity of diethylene glycol bis (allyl carbonate) prepared as in Example V, was dissolved in an equal weight of dioxane and 4 percent benzoyl peroxide on the basis of the weight of the polymer was introduced.

*Example XVI*

A quantity of ethylene glycol bis (methallyl carbonate) prepared as in Example II was dissolved in an equal weight of dioxane and 4 percent benzoyl peroxide on the basis of the weight of the polymer was introduced. The solution was heated, with stirring, at 80 to 85° C. until the viscosity doubled. Thereafter, the mixture was cooled and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A white fusible polymer was obtained. A quantity of this polymer was mixed with 5 percent benzoyl peroxide, placed in a mold and heated to 145° C. under a pressure of 2000 pounds per square inch for 20 minutes. A colorless sheet of infusible, insoluble polymer was obtained.

*Example XVII*

A quantity of diethylene glycol bis (methallyl carbonate) prepared as in Example VIII, was dissolved in an equal weight of dioxane and 4 percent benzoyl peroxide on the basis of the weight of the ester was introduced. The solution was heated, with stirring, at 80 to 85° C. until the viscosity doubled. Thereafter, the mixture was cooled and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A white gummy mass was obtained. A quantity of this polymer was mixed with one percent benzoyl peroxide, placed in a mold and heated to 150° C. under a pressure of 2000 pounds per square inch for 20 minutes. A colorless sheet of infusible insoluble polymer was obtained.

*Example XVIII*

A quantity of polyvinyl alcohol was dissolved by heating with about 10 times its weight of pyridine for 16 hours at 85° C. The solution was cooled to about 0° C. and mixed with cold allyl chloroformate while maintaining the temperature at 5 to 7° C. The mixture was stirred, warmed to 40° C. and poured into water slightly acidified with hydrochloric acid. A white sticky gum was precipitated. This gum was dissolved, reprecipitated with water from acetone solution and a tough, white polymer was obtained. This product cured to an infusible, insoluble state upon heating with 5 percent benzoyl peroxide.

*Example XIX*

A quantity of glyceryl tri (allyl carbonate) containing 5 percent benzoyl peroxide was heated at 75° C. for 18 hours and a hard, colorless solid was obtained.

*Example XX*

The process of Example I was repeated using 2-chloroallyl alcohol in lieu of allyl alcohol and a colorless liquid high boiling liquid which polymerized on distillation at a pressure of 2 mm. was obtained. This product polymerized in a manner similar to glycol di (allyl carbonate).

*Example XXI*

A mixture of 250 cc. of benzene, 165 gms. of propolylene glycol (1,2-dihydroxy propane) and 350 gms. of pyridine was cooled to +2° C. on an ice bath in a 3 liter flask. With constant stirring 500 gms. of allyl chloroformate was added slowly. For the first half-hour the addition was made at the rate of 5 gms. per minute. The rate of addition was slowly increased until at the end of an hour it was 10 gms. per minute. The balance of the chloroformate was added at the rate of 20–25 gms. per minute. When the chloroformate addition was completed the mixture was stirred for an hour. During the entire reaction the temperature remained between 0° C. and 12° C. The benzene solution was washed with dilute HCl and with water and dried over CaCl₂. The propylene bis (allyl carbonate) was purified by distillation and was found to have a density of 1.115 and an index of refraction of 1.4414. The ester was believed to have the structure:

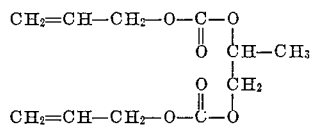

a 25 gram sample was mixed with 5 percent acetone peroxide and heated at 135° C. for one hour. A brittle, transparent and nearly colorless solid polymer was produced.

*Example XXII*

Using the procedure of Example XXI and substituting dipropylene glycol for the propylene glycol an ester of the following constitution was synthesized:

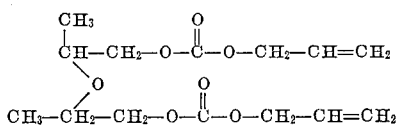

It was found to have an index of refraction of 1.4425.

*Example XXIII*

A mixture of 135 gms. of pentaerythritol, 500 cc. benzene and 400 gms. pyridine was prepared in a 5 liter reaction flask provided with a stirring mechanism and a dropping funnel. The mixture was cooled to +2° C. on an ice bath. 500 gms. of allyl chloroformate was added slowly with vigorous agitation and at such a rate that permitted complete dissipation of the heat of reaction. During the reaction the temperature within the reaction flask reached a maximum of +7° C. but remained below +5° C. during the greater part of the time. When the reaction was completed the benzene solution was washed with diluted hydrochloric acid and with water and until neutral. The new ester pentaerythritol tetrakis (allyl carbonate) was separated from the benzene and other volatile impurities by distillation in a vacuum. The ester had an index of refraction 1.4695 and a density 1.182. Its structure was believed to be:

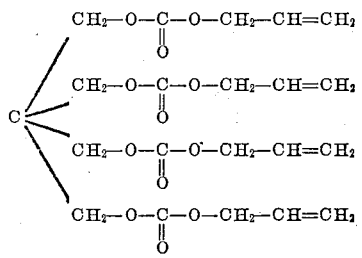

*Example XXIV*

A mold was prepared by clamping two sheets of polished plate glass (12" x 12") with a strip of Koroseal (38" x ¼" x ½") between. The flexible Koroseal strip was placed about 1 to 1½" from the edge of the glass plates with the ends about one inch short of butting at one corner. The plates were held together with C clamps placed directly over the flexible divider. The mold was then placed in a vertical position with the open corner uppermost.

About 500 cc. of 1,2-propylene glycol bis (methallyl carbonate) was thickened by heating for two hours at 60° C. in the presence of 3 percent benzoyl peroxide. The thickened ester was then poured into the mold and permitted to stand until all bubbles rose to the surface. The mold was then heated for 20 hours at 80° C. During the heating the C clamps were tightened, every four hours to recover the pressure lost by the shrinking of the resin. The mold was then taken apart and the product was a sheet of resin clear and almost colorless with an optically perfect surface.

*Example XXV*

About 200 cc. of trimethylene glycol bis (allyl carbonate) were mixed with 20 gms. cellulose pulp and .5% cadmium yellow pigment and 3% acetone peroxide. The mixture was heated for 4 hours in an atmosphere of CO₂ maintained by a stream of the CO₂ passing through the covered tray. The composition was pulverized and screened. A sample was pressed in a mold under 1800 pounds per square inch at a temperature of 150° C. The product was hard, glossy, semi-translucent, and of a uniform brilliant yellow color.

This application is a continuation in part of our applications for Letters Patent Serial No. 361,280, filed October 15, 1940 and Serial No. 437,564, filed April 3, 1942, both of which are now abandoned.

Although the present invention has been described with reference to the specific details of certain embodiments thereof, it is not intended that such details shall be regarded as limitations upon the scope of the invention except insofar as included in the accompanying claims.

We claim:

1. A neutral of: (a) polyvinyl alcohol and (b) allyl acid carbonate wherein at least two hydroxy groups of (a) are esterified with (b).

2. A neutral ester of (a) polyvinyl alcohol and (b) an acid ester of carbonic acid and an unsaturated monohydric alcohol having 3 to 9 carbon atoms and having an unsaturated carbon to carbon linkage in an aliphatic chain between the beta and gamma carbon atoms of the alcohol; wherein at least two hydroxy groups of (a) are esterified with (b).

IRVING E. MUSKAT.
FRANKLIN STRAIN.

REFERENCES CITED

The following references are of record in the file of this patent:

UNITED STATES PATENTS

| Number | Name | Date |
|---|---|---|
| 2,249,749 | Dickey et al. | July 22, 1941 |
| 2,370,565 | Muskat et al. | Feb. 27, 1945 |
| 2,384,115 | Muskat et al. | Sept. 4, 1945 |
| 2,384,123 | Muskat et al. | Sept. 4, 1945 |
| 2,384,125 | Muskat et al. | Sept. 4, 1945 |
| 2,385,932 | Muskat et al. | Oct. 2, 1945 |
| 2,385,933 | Muskat et al. | Oct. 2, 1945 |
| 2,385,934 | Muskat et al. | Oct. 2, 1945 |
| 2,403,113 | Muskat et al. | July 2, 1946 |